United States Patent Office 2,952,714
Patented Sept. 13, 1960

2,952,714
METHOD OF CONTROLLING ALKANE OXYCHLORINATION PROCESS

Joseph E. Milam, New Martinsville, W. Va., William E. Makris, Shadyside, Ohio, and Robert E. McGreevy, New Martinsville, W. Va., assignors to Columbia-Southern Chemical Corporation, a corporation of Delaware No Drawing. Filed Oct. 13, 1958, Ser. No. 766,678

8 Claims. (Cl. 260—662)

The present invention relates to the production of chlorinated hydrocarbons. More particularly, the present invention relates to a method of controlling the chlorination of hydrocarbons in processes employing gaseous hydrogen chloride as a source of chlorine.

It has been proposed to chlorinate lower aliphatic hydrocarbons utilizing gaseous hydrogen chloride as a chlorinating agent. In processes of this type, gaseous hydrogen chloride, an oxygen containing gas such as air, and the hydrocarbon to be chlorinated are passed in contact with a metal halide catalyst. By a series of well known reactions elemental chlorine ($Cl_2$) is released from the HCl feed and chlorinates the hydrocarbon feed material. In another modification of this process, elemental chlorine ($Cl_2$) is used as the feed gas in place of gaseous hydrogen chloride. This latter process operates in a manner similar to the first except that an initial chlorination of the hydrocarbon takes place. Thus, free chlorine, an oxygen containing gas and the hydrocarbon to be chlorinated, are passed in contact with a metal halide catalyst. The chlorine reacts with the hydrocarbon to produce hydrogen chloride and a chlorinated product of the hydrocarbon. Hydrogen chloride produced in this manner is then converted to elemental chlorine by a well known series of reactions thereby providing additional chlorine for the chlorination of more hydrocarbon feed.

Although chlorinations of this type are well known in the art, there are serious operational difficulties generally associated with them. Thus, for example, it is found that the reaction takes place in localized areas of "hot spots" which results frequently in uncontrollable temperatures within the catalyst beds and reactors employed. In addition, since preferably excess quantities of air or other types of oxygen containing gas are employed in an effort to obtain efficient utilization of hydrogen chloride, considerable burning of the hydrocarbons occurs. This burning further contributes to severe temperature conditions within catalyst beds and reactors. Quite frequently low utilization of chlorine or hydrogen chloride feed is also experienced.

The term "utilization" as used herein in conjunction with the HCl and $Cl_2$ feed materials employed refers to the amount of chlorine as HCl or $Cl_2$ fed to the system which is recovered as a chlorinated product. The values given are expressed as percentage by weight of chlorinating material fed. Thus an HCl utilization of 70 percent indicates that 70 percent by weight of chlorine fed as HCl to the system was recovered as chlorinated product.

Because of severe temperature conditions encountered and the corrosive nature of the atmospheres found within reactors employed in chlorinations of this type, corrosion of reactor walls is usually very pronounced and destructive. The catalyst is usually rapidly contaminated or poisoned with products of corrosion and its life is shortened as a result. Quite frequently, conditions are so severe that catalyst replacement from reactors becomes very tedious and impractical due to fusion of catalyst particles with themselves and with the reactor walls. Long and costly cleaning operations, therefore, become necessary to remove catalyst which seriously affects the economy of the process.

By the method of the present invention many of the problems normally associated with chlorinations of the type contemplated herein can be eliminated or alleviated to a great extent. Thus, "hot spot" temperatures can be controlled within tolerable limits; hydrocarbon burning can be substantially reduced; longer catalyst life can be achieved; and removal problems associated with spent catalyst greatly reduced. Longer life in the reactors is also made possible due to substantial reductions in the corrosion rates normally encountered in processes such as these. In addition excellent HCl and $Cl_2$ utilizations are obtained while achieving the desirable operational advantages mentioned above.

Thus, it has been found according to the present invention that by carefully controlling the oxygen content of product gases from a chlorination process involving the use of gaseous hydrogen chloride as a chlorinating agent it is now possible to perform the chlorination so that the hereinbefore enumerated advantages can be obtained. Consequently, it has been found that when a gaseous mixture of an aliphatic hydrocarbon containing from 1 to 4 carbon atoms, an oxygen containing gas and a chlorinating agent are passed in contact with a metal halide catalyst zone it is possible to control the reaction and consequent efficiency of the process by continuously removing reactant product gases from the catalyst zone periodically analyzing these gases for their free oxygen content, and in response to such analysis adjusting the amounts of gases fed to the catalyst bed to provide in the product gas stream between 0.02 percent and 5 percent free oxygen ($O_2$) by volume. Maintaining the free oxygen content of the product gas stream within the values above set forth results in the production of chlorinated hydrocarbons without any serious operational difficulties normally associated with such a process. Useful chlorinating agents are hydrogen chloride, elemental chlorine and mixtures of hydrogen chloride and elemental chlorine.

Analysis of the product gas stream may be carried out continuously or on a periodic or intermittent basis. For convenience it is more practical to carry the analysis out at definite periodic intervals of time. The particular analytical procedure employed in the process is not of critical significance. Any analytical equipment may be employed which will give accurate, rapid results. Thus, modified Orsat analyzers, thermal conductivity analyzers, combustible type hot wire analyzers, vapor phase chromatography devices, and the like, may be employed to conduct the analysis of the product stream. If desired suitable electrical and solenoid switching devices may be linked from the analyzer to the reactant feed valves so that adjustment and response to any analysis can be made automatically.

The optimum concentration of free oxygen permitted in the exit gas stream or the product gas stream will vary dependent upon the chlorinating agent employed in the starting feed material. Thus when gaseous hydrogen chloride is employed as the starting material the oxygen content of the product gas stream is preferably maintained somewhere between about 1.0 percent and 4.5 percent by volume of the exit gas stream. Similarly, when free elemental chlorine is employed as the starting feed material, the oxygen content of the exit gas stream is maintained preferably between 0.02 percent and 3.0 percent by volume.

Processes of this type are conducted in the presence of a metal halide catalyst. The metal used in the catalyst is one of variable valence such as copper, chromium, iron, and the like, and may be employed alone or in combination with other metals such as sodium, potassium, and the like. Preferably, catalysts are in the form of metal chloride salts and are impregnated on an inert material which provides considerable surface are for the process reactants to contact the catalyst. Various carriers may be employed such as, for example, silica gel, aluminum, kieselguhr, pumice and other well known carrier materials. A particularly suitable material is Celite 22, a calcined diatomaceous earth (Lompoc, California diatomite) sold by the Johns-Manville Corporation, under the name Celite 22. This material impregnated with a cupric chloride-potassium chloride catalyst has been found particularly desirable in conducting reactions of the type herein contemplated.

A free or elemental oxygen ($O_2$) containing gas is employed in accordance with this invention. Thus, elemental oxygen ($O_2$) is found suitable for use in the process and may be employed alone or mixed with various inert diluents such as nitrogen, argon, neon, and the like. Air comprises a particularly suitable gas for supplying elemental oxygen to the process since it is easily obtained and inexpensive. Other types of oxygen-containing gases, i.e., gases which contain elemental oxygen ($O_2$) therein may also be employed. Thus oxygen enriched air, oxygen or air mixed with inert gases or vapors or mixtures of oxygen, air and inert gases or vapors may be conveniently utilized in accordance with the teachings of the present invention without impairing results in any way.

Temperature and pressure conditions may be varied considerably without seriously interfering with the process of this invention. While it is preferred to operate the system herein described at or near atmospheric pressure for operational convenience, both superatmospheric pressures and subatmospheric pressures may be utilized if desired. Similarly, while temperatures between 450° C. to about 550° C. are preferably employed in the catalyst zones, considerable variations may be made without detrimental effect. Thus the temperature may be lowered to 350° C. or lower or raised to 700° C. or higher if desired.

The process of the present invention is especially suited to chlorination reactions employing tubular or elongated reactors; i.e., a reactor of considerable length as contrasted with its internal diameter. Thus their length is between 8 to 600 times their internal diameter. Preferably the reactors are fabricated of stainless steel, nickel or other suitable structural metal but they may also be suitably coated on their inner walls with ceramic material.

The residence time of gases in catalyst zones is subject to variation without seriously effecting the results. Thus, while preferably reactant feed rates are adjusted so as to provide a residence time for reactant gases in the catalyst beds of between about 0.5 to about 3 seconds, reactant gas feed rates may be adjusted to provide residence times as short as 0.2 second to as long as 10 seconds or longer and still maintain an efficient process.

Chlorinating procedures of the type encountered in the process of this invention are exothermic in nature. Removal of heat from the gas stream is thus desirable. This may be accomplished by use of an adequate heat exchange system associated with the reactors employed. By jacketing the reactors, and circulating therein a cooling medium it is possible to obtain efficient control of bed temperatures. The maintenance of this control is accomplished by inserting thermoregulating devices in the heat exchange medium, so that a close temperature control of the medium itself is provided for. A molten salt mixture of $KNO_3$, $NaNO_2$, and $NaNO_3$ constantly circulated throughout the reactor jacket has been found particularly suitable.

The feed ratios of the various components of the feed gases reacted in the catalyst zones in accordance with this invention may be subjected to considerable variation without seriously interfering with the process. Thus for example, the chlorinating agent employed may be fed to the system at a rate such that from between 0.5 mole to about 5 moles or even more chlorinating agent is supplied for each mole of hydrocarbon fed. Less than 0.5 mole of chlorinating agent may be utilized for each mole of hydrocarbon fed in the process of this invention but will usually result in supplying too small a quantity of chlorine to completely chlorinate all of the hydrocarbon feed. Employment of chlorinating agent in excess of 5 moles for each mole of hydrocarbon employed is likewise permissible though chlorine will be supplied in quantities greater than necessary to completely chlorinate all the hydrocarbon fed.

The rates of feed employed for the oxygen-containing gas is also variable. Enough oxygen is supplied to insure oxidation of the chlorinating medium and still provide at least 0.02 percent by volume unreacted oxygen in the exit gas stream. Considerable amounts of excess oxygen may be employed if desired but quantities supplying more than 5 percent by volume free oxygen in the exit gas stream are not particularly beneficial. Thus if the oxygen content of the feed gas is maintained so that between about 0.8 mole and 1.5 moles of free oxygen are supplied to the system for each mole of chlorinating agent employed, beneficial results are achieved.

The process of the present invention is designed for the production of chlorinated hydrocarbon products of saturated lower aliphatic hydrocarbons containing from 1 to 4 carbon atoms. While hydrocarbons such as methane, ethane, propane and butane are generally employed as the starting hydrocarbon feed material, it is of course understood that partially chlorinated hydrocarbons containing 1 to 4 carbon atoms may also be employed as feed material. Thus, partially chlorinated methane, ethane, propane and butane products such as methyl chloride, ethyl chloride, chloroform, trichloroethylene, 1-chloropropane, 1-chlorobutane, and the like, may be employed alone or in a mixture with other partially chlorinated hydrocarbons or with saturated hydrocarbon feed materials containing from 1 to 4 carbon atoms.

Therefore the process of the present invention includes chlorination of aliphatic hydrocarbon having from 1 to 4 carbon atoms and their incompletely chlorinated derivatives. The incompletely chlorinated derivative may comprise chlorine addition and substitution products of aliphatics having 1 to 4 carbon atoms. Preferably compounds fed to the system are chlorinatable aliphatic compounds having the formula:

$$C_nH_mX_r$$

where X represents chlorine, $n$ is an integer from 1 to 4, $m$ is an integer of at least 1 and the sum of $m+r$ is $2n+2$.

Products formed by the reactions accruing in the present invention are numerous and varied, and depend upon the particular hydrocarbon feed employed. Thus when butane or propane are employed more products are formed than when ethane or methane are used as feed. Saturated and unsaturated compounds are produced. Thus when butane is used as the hydrocarbon feed, for example, methyl chloride, methylene chloride, chloroform, carbon tetrachloride, butyl chloride, dichlorobutane, ethyl chloride, propyl chloride, ethane, ethylene, propane, propylene, methane and the like are produced. When propane, ethane or methane are employed the variety of products decreases in proportion to the number of carbon atoms contained in the hydrocarbon feed gas.

Product recovery from systems conducted in accordance with this invention may be accomplished by employing various well known techniques. Thus carbon absorption trains, Dry Ice cold traps and fractional distillation procedures or combinations of these procedures may be conveniently employed to separate the multitude of products present in product gases emanating from these processes. The higher the carbon content of the hydrocarbon feed employed the more numerous the products formed and consequently the more intricate the recovery system necessary to separate product gas into its components.

In operation of the process of the present invention, a tubular reactor is charged throughout a substantial portion of its length with a metal halide catalyst impregnated on inert carrier material. Screens and plugs are provided at either end of the reactor to hold the catalyst in place. A molten salt mixture is circulated constantly through a jacket which encloses all of the reactor tube containing the catalyst, and is connected to a thermo-regulating system so as to maintain a constant temperature salt bath in the jacket. A mixture of the hydrocarbon to be chlorinated, an oxygen-containing gas and a chlorinating agent selected from the group consisting of HCl, $Cl_2$, or a mixture of HCl and $Cl_2$ are fed into the reactor at one end. The gaseous reactant products are removed at the end of the reactor opposite the feed inlet and either continuously, or at periodic intervals of time, these gaseous products are analyzed for their oxygen content. In response to such analysis, the feed rates of the hydrocarbon, the oxygen-containing gas or the chlorinating agent or any combination of these gas feeds are adjusted to provide in the exit gas stream an oxygen content ranging between 0.02 percent and 5 percent free oxygen by volume.

By the method of the present invention it is now possible to continuously chlorinate a lower aliphatic hydrocarbon such as methane, ethane, or propane, and still maintain a close control over operational difficulties usually encountered in these chlorinations. As long as the oxygen content of the product gas stream is maintained within the defined limits hereinbefore set forth, the operational advantages enumerated before are obtainable. It is found, however, that when the percentage of oxygen in the exit stream exceeds the upper limit or falls below the lower limit of oxygen to be maintained in the exit product stream, one or more of the advantages otherwise obtainable are lost.

The following examples are illustrative of the manner in which the present invention may be performed.

EXAMPLE I

A catalyst was prepared by dissolving 441.0 grams of $CuCl_2 \cdot 2H_2O$ and 186.8 grams of KCl in 1000 milliliters of distilled water. One thousand milliliters of Celite pellets were added to the solution and allowed to soak for a period of 24 hours at ambient temperature (25°C.). The supernatant liquor (860 milliliters) was drained off and the pellets dried with a Westinghouse sun lamp at a temperature of 100° C. The dried pellets had a solids loading of 33.1 percent by weight of salts in solution corresponding to 7.82 percent copper, 5.48 percent potassium and 13.65 percent chloride ion by weight of impregnated carrier.

EXAMPLE II

A 30-inch uncoated vertically disposed reactor tube 1 inch in diameter and fabricated of stainless steel was charged with 26 inches of the catalyst prepared in Example I. The tube was screened and plugged so as to provide 2 inches on either end of the reactor tube free of catalyst. A stainless steel insulated jacket was placed around the 26-inch section of the reactor containing the catalyst and provided with side arms at the top and bottom. The jacket side arms were connected to a stainless steel reservoir 2½ inches in diameter and charged with a salt mixture comprising by weight 53 percent $KNO_3$, 40 percent $NaNO_2$ and 7 percent $NaNO_3$.

The outside of the reservoir was fitted with strip heaters and a thermoregulator placed in the reactor jacket in communication with the salt bath about one fourth of the way down from the top of the reactor tube. Suitable connections between the thermoregulator and the heaters were made so as to provide automatic control of the salt bath temperature. The heaters were activated and the salt melted and held at a temperature of 450° C. A mechanical stirrer placed in the reservoir was provided to insure adequate circulation of the salt bath liquid medium through the reactor jacket.

Methane was taken from a jet pumped through a Sigma pump, the pressure regulated to between 4 and 5 pounds per square inch gauge, passed through a surge tank and metered through a calibrated orifice meter. Air was passed from a compressed air tap, through a glass wool filter, the pressure reduced to between 4 and 5 pounds per square inch gauge and metered through an orifice meter. Anhydrous HCl was taken from a cylinder through a stainless steel needle valve and metered through a rotameter. The methane, air and HCl were mixed and passed into the reactor at the top.

A tubular tap at the bottom of the reactor was provided and connected to a vapor phase chromatographic gas analyzer for periodic analysis of the exist gas stream issuing from the reactor. The methane, air and HCl feed components were regulated to provide a one second contact time in the catalyst bed. The volume percentage of unreacted oxygen in the exit gases from the reactor was determined at periodic intervals and maintained at three different levels for three distinct runs by regulating feed components in response to any change from the level of each run. The results are shown in Table I. The chloromethanes were collected by condensation in a cold trap.

*Table I*

|  | Run 1 | Run 2 | Run 3 |
|---|---|---|---|
| Molar Feed Ratio: |  |  |  |
| $CH_4$ | 1.00 | 1.00 | 1.00 |
| HCl | 2.15 | 2.15 | 2.15 |
| Air | 8.45 | 7.50 | 4.00 |
| Exit Gas Composition As Volume Percent: |  |  |  |
| Chloromethanes | 7.9 | 8.5 | 11.75 |
| $O_2$ | 4.3 | 1.4 | 0.00 |
| Pounds Product Per Pound Catalyst Per Hour | 0.24 | 0.27 | 0.28 |
| Percent HCl Utilization | 90.0 | 88.0 | 61.9 |
| Hotspot °C | 508 | 515 | 496 |
| Volume Percent of $CH_4$ Fed Remaining Unreacted | 2.3 | 1.9 | 25.9 |
| Grams Product (4 Hour Period) | 230.7 | 232.0 | 190.0 |
| Mole Percent of Product Components: |  |  |  |
| $CCl_4$ | 34.7 | 39.7 | 14.2 |
| $CHCl_3$ | 42.8 | 43.1 | 35.8 |
| $CH_2Cl_2$ | 16.4 | 13.6 | 36.4 |
| $CH_3Cl$ | 6.1 | 3.6 | 13.6 |

EXAMPLE III

The apparatus and procedures followed in Example II were employed except that gaseous chlorine was employed in place of gaseous hydrogen chloride. A periodic analysis of the exit gas stream was again made and the unreacted oxygen content in the exit gas stream maintained at varying values for three runs by adjustment of feed rates in response to any change from the value set during the run. The results of these runs are shown in Table II.

*Table II*

|  | Run 3 | Run 4 | Run 5 |
|---|---|---|---|
| Molar Feed Ratio: |  |  |  |
| $CH_4$ | 1.00 | 1.00 | 1.00 |
| $Cl_2$ | 0.95 | 0.95 | 0.95 |
| Air | 5.19 | 3.97 | 3.20 |
| Exit Gas Composition As Volume Percent: |  |  |  |
| Chloromethane | 11.5 | 14.4 | 15.25 |
| $O_2$ | 2.78 | 0.04 | 0.00 |
| Pounds Product Per Pound Catalyst Per Hour | .659 | .747 | .693 |
| $Cl_2$ Utilization | 94.3 | 94.3 | 81.5 |
| Hotspot °C | 517 | 515 | 515 |
| Grams Product (4 Hour Period) | 345 | 377 | 373 |
| Mole Percent of Product Components: |  |  |  |
| $CCl_4$ | 26.5 | 21.9 | 15.9 |
| $CHCl_3$ | 43.9 | 42.4 | 39.1 |
| $CH_2Cl_2$ | 25.3 | 29.7 | 33.3 |
| $CH_3Cl$ | 4.5 | 6.8 | 11.6 |

EXAMPLE IV

An 8½ foot uncoated, vertically-disposed reactor tube 1½ inches in diameter and fabricated of stainless steel was charged with 83 inches of the catalyst prepared in Example I. The reactor tube was screened to provide at the bottom a 2 inch section of the tube free of catalyst and on the top portion 16 inches of inert Celite pellets were packed on top of the active catalyst bed. The reactor was jacketed along 100 inches of its length so that the inert and active catalyst beds were surrounded by the jacketing in the same manner as the 30 inch reactor of Example II was jacketed.

The heaters and stirring devices and thermal regulators employed were identical to those used in Example II. The methane HCl and Cl$_2$ and air fed to the reactor utilized the same equipment as employed in the metering of these gaseous feed materials as shown by Example II.

The analysis and collection of the gaseous materials exiting from the reactor was conducted in the same manner as employed in Example II. The results are shown below in Table III.

Table III

|  | Run 3 | Run 4 | Run 5 |
|---|---|---|---|
| Molar Feed Ratios: |  |  |  |
| CH$_4$ | 1.00 | 1.00 | 1.00 |
| Cl$_2$ | 0.53 | 0.65 | 0.21 |
| HCl | 0.83 | 0.65 | 1.32 |
| Air | 4.70 | 4.70 | 4.70 |
| Exit Gas Composition As Volume Percent: |  |  |  |
| Chloromethanes | 9.19 | 11.30 | 10.25 |
| Oxygen (O$_2$) | 0.76 | 0.29 | 0.40 |
| Pounds Products Per Pound Catalyst Per Hour | 0.118 | 0.120 | 0.103 |
| HCl and Cl$_2$ Efficiency | 88.6 | 87.8 | 89.9 |
| Hotspot | 408 | 420 | 398 |
| Grams Product (4 Hour Period) | 712.0 | 720.8 | 620.0 |
| Mole Percent of Product Components: |  |  |  |
| CCl$_4$ | 10.6 | 11.5 | 6.1 |
| CHCl$_3$ | 33.3 | 34.7 | 26.9 |
| CH$_2$Cl$_2$ | 32.7 | 33.7 | 40.2 |
| CH$_3$Cl | 23.4 | 20.1 | 26.8 |

Thus as can be readily seen from an examination of Tables I, II, and III, by carefully controlling the volume percentage of oxygen in the product gases emanating from a reactor in which lower aliphatic hydrocarbons are chlorinated utilizing oxychlorination techniques, the achievement of advantageous results is possible. In addition to the results shown in the tables, it has been found that catalyst replacement in the reactor tubes can now be accomplished readily so long as the free oxygen (O$_2$) content of the exit gas stream is maintained within the prescribed limits. Thus, catalyst removal from reactors of the type employed in the process described above can now be accomplished in a matter of minutes, whereas many hours would be required had the process run in the absence of such control.

While the invention has been described with reference to certain specific examples, it is not intended that these be taken as limitations on the scope of the invention. For example, while the invention has been particularly described with reference to methane, it can be carried out with ethane, propane, butane and incompletely chlorinated derivatives of these compounds. As long as the oxygen content of the exit gas stream is maintained within the defined limits the superior operational conditions hereinbefore described will be obtained. The invention therefore is not to be limited in scope except insofar as appears in the appended claims.

This application is a continuation-in-part of our co-pending application, U.S. Serial No. 705,813, filed December 30, 1957, and now abandoned.

We claim:

1. A process for the chlorination of aliphatic hydrocarbons containing from 1 to 4 carbon atoms and their incompletely chlorinated derivatives in the gaseous phase comprising reacting the material to be chlorinated, an oxygen-containing gas and a chlorinated agent selected from the group consisting of HCl, Cl$_2$ and mixtures of HCl and Cl$_2$, in a metal halide catalyst zone, continuously removing the resulting product gases from said zone, analyzing said product gases to determine the elemental oxygen (O$_2$) content thereof, adjusting feed rates of the gases fed to the catalyst zone in response to such analysis to provide in the product gases between about 0.02 percent and about 5 percent elemental oxygen by volume.

2. A process for the chlorination of aliphatic hydrocarbons containing from 1 to 4 carbon atoms and their incompletely chlorinated derivatives in the gaseous phase comprising reacting the material to be chlorinated, an oxygen-containing gas and HCl in a metal halide catalyst zone, removing the resulting product gases from said zone, analyzing said product gases to determine the elemental oxygen (O$_2$) content thereof, adjusting feed rates of the gases fed to the catalyst zone in response to such analysis to provide in the product gases between about 1 and about 4.5 percent elemental oxygen by volume.

3. A process for the chlorination of aliphatic hydrocarbons containing from 1 to 4 carbon atoms and their incompletely chlorinated derivatives in the gaseous phase comprising reacting the material to be chlorinated, an oxygen-containing gas and gaseous chlorine in a metal halide catalyst zone, continuously removing the resulting product gases from said zone, analyzing said product gases to determine the elemental oxygen (O$_2$) content thereof, adjusting feed rates of the gases fed to the catalyst zone in response to such analysis to provide in the product gases between about 0.02 and 3 percent elemental oxygen by volume.

4. A process for the chlorination of aliphatic hydrocarbons containing from 1 to 4 carbon atoms and their incompletely chlorinated derivatives in the gaseous phase comprising reacting the material to be chlorinated, an oxygen-containing gas and a gaseous mixture of HCl and Cl$_2$ in a metal halide catalyst zone, removing the resulting product gases from said zone, analyzing said product gases to determine the elemental oxygen (O$_2$) content thereof, adjusting feed rates of the gases fed to the catalyst zone in response to such analysis to provide in the product gases between about 0.02 and 5 percent elemental oxygen by volume.

5. The method of claim 1 wherein the material to be chlorinated is methane.

6. The method of claim 2 wherein the material to be chlorinated is methane.

7. The method of claim 3 wherein the material to be chlorinated is methane.

8. The method of claim 4 wherein the material to be chlorinated is methane.

References Cited in the file of this patent

UNITED STATES PATENTS

| | | |
|---|---|---|
| 1,952,122 | Deanesley | Mar. 27, 1934 |
| 2,284,482 | Vaughan et al. | May 26, 1942 |
| 2,752,401 | Joseph | June 26, 1956 |
| 2,752,402 | Pye | June 26, 1956 |
| 2,783,286 | Reynolds | Feb. 26, 1957 |
| 2,866,830 | Dunn et al. | Dec. 30, 1958 |

UNITED STATES PATENT OFFICE

CERTIFICATE OF CORRECTION

Patent No. 2,952,714                September 13, 1960

Joseph E. Milam et al.

It is hereby certified that error appears in the above numbered patent requiring correction and that the said Letters Patent should read as corrected below.

Column 3, line 5, for "are" read -- area --.

Signed and sealed this 12th day of September 1961.

(SEAL)
Attest:

ERNEST W. SWIDER
Attesting Officer

DAVID L. LADD
Commissioner of Patents

USCOMM-DC